(12) United States Patent
Niu et al.

(10) Patent No.: US 11,858,769 B2
(45) Date of Patent: Jan. 2, 2024

(54) WEB SPLICE

(71) Applicant: Sonoco Development, Inc., Hartsville, SC (US)

(72) Inventors: Xiaokai Niu, Hartsville, SC (US); David E. Rhodes, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 59 days.

(21) Appl. No.: 16/847,065

(22) Filed: Apr. 13, 2020

(65) Prior Publication Data
US 2020/0324992 A1    Oct. 15, 2020

Related U.S. Application Data

(60) Provisional application No. 62/869,191, filed on Jul. 1, 2019, provisional application No. 62/833,891, filed on Apr. 15, 2019.

(51) Int. Cl.
  *B65H 19/18*    (2006.01)
  *B29C 65/00*    (2006.01)

(52) U.S. Cl.
  CPC .... B65H 19/1842 (2013.01); *B29C 66/12423* (2013.01); *B29C 66/12443* (2013.01); *B65H 2301/4615* (2013.01); *B65H 2301/4622* (2013.01); *B65H 2301/46314* (2013.01)

(58) Field of Classification Search
  CPC ........ B65H 19/1842; B65H 2301/4622; B65H 2301/4623; B65H 2301/4625; B65H 2301/4631; B65H 2301/4632; B65H 2301/4637; B29C 66/124; B29C 66/1242; B29C 66/12421; B29C 66/12423
  See application file for complete search history.

(56) References Cited

U.S. PATENT DOCUMENTS

| | | | | |
|---|---|---|---|---|
| 1,727,349 A | * | 9/1929 | Lyman | G03D 15/043 352/233 |
| 2,646,938 A | | 7/1953 | Wieking | |
| 3,833,447 A | * | 9/1974 | Gustafson | G03D 15/043 156/505 |
| 3,874,968 A | * | 4/1975 | Robinson | B29C 66/853 156/154 |
| 4,169,752 A | * | 10/1979 | Tokuno | B65H 19/1831 156/157 |
| 4,540,456 A | * | 9/1985 | Kaida | G03D 13/005 156/506 |
| 5,397,076 A | * | 3/1995 | Padilla | B65H 19/102 242/556.1 |
| 5,514,436 A | * | 5/1996 | Schlueter, Jr. | B29C 66/4322 428/57 |
| 5,601,676 A | | 2/1997 | Zimmerman et al. | |
| 5,996,927 A | | 12/1999 | Weirauch et al. | |
| 7,516,916 B2 | * | 4/2009 | Titz | B65H 19/102 242/553 |

(Continued)

FOREIGN PATENT DOCUMENTS

JP        53097404 A  *  8/1978

*Primary Examiner* — George R Koch
*Assistant Examiner* — Christopher C Caillouet
(74) *Attorney, Agent, or Firm* — von Briesen & Roper, s.c.

(57) ABSTRACT

A web splice for attaching two webs, such as paper webs used in paper converting operations. The web splice comprises a non-linear butt joint. The butt joint forms an acute included angle (α) with the side edges.

12 Claims, 5 Drawing Sheets

(56) References Cited

U.S. PATENT DOCUMENTS

| | | | | |
|---|---|---|---|---|
| 9,206,066 B2* | 12/2015 | Garner | ................ | C03B 33/0235 |
| 2005/0186418 A1* | 8/2005 | Fujii | ................... | B29C 66/1122 |
| | | | | 428/343 |
| 2007/0201897 A1* | 8/2007 | Maeda | ................. | G03G 15/161 |
| | | | | 399/101 |
| 2009/0308001 A1* | 12/2009 | Wu | .................... | E04F 13/0885 |
| | | | | 52/173.3 |
| 2013/0236675 A1 | 9/2013 | Garner et al. | | |
| 2021/0039913 A1* | 2/2021 | Engleman | .............. | B65H 37/04 |

* cited by examiner

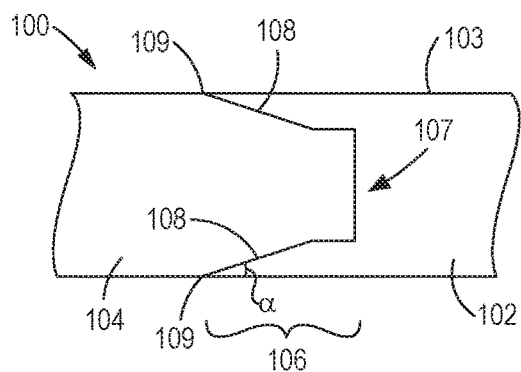
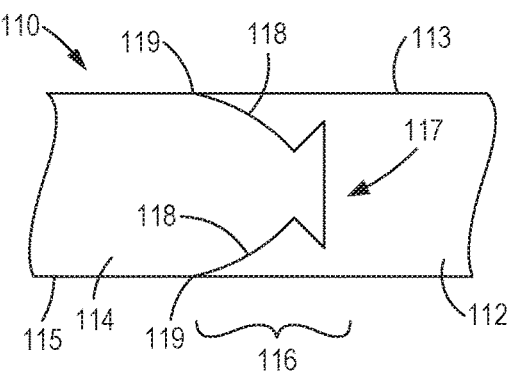
FIG. 5                    FIG. 6
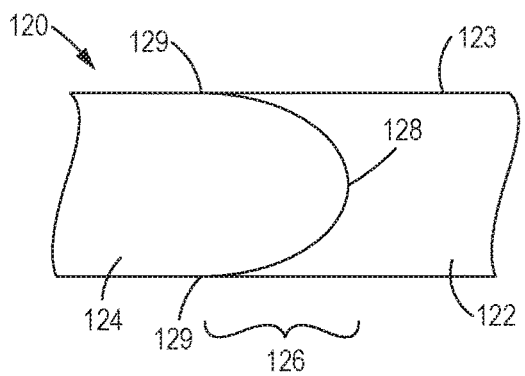
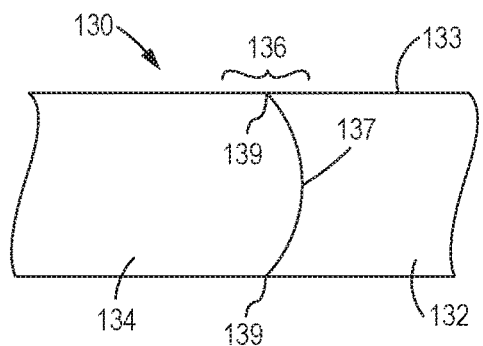
FIG. 7                    FIG. 8
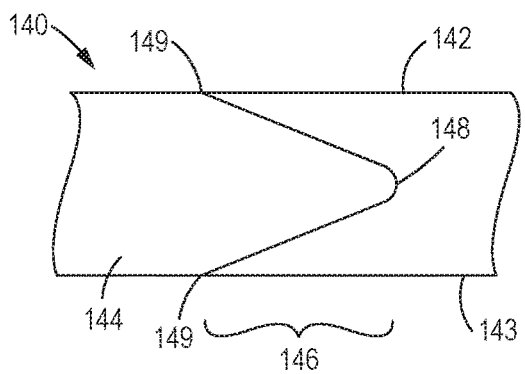
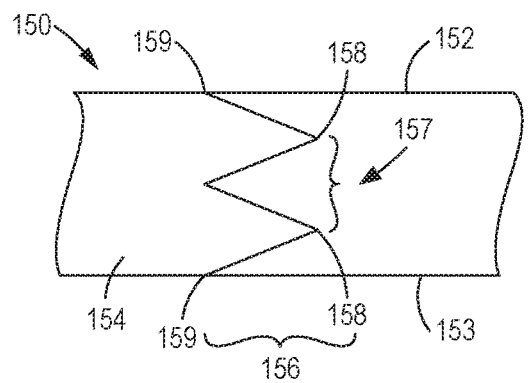
FIG. 9                    FIG. 10

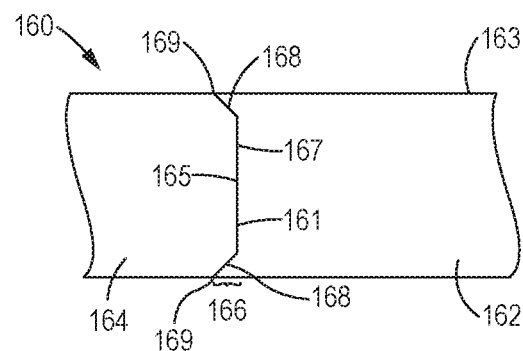
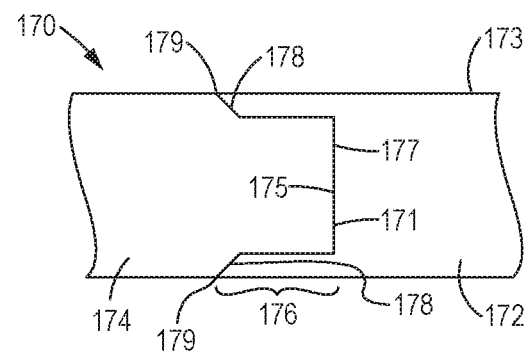
FIG. 11  FIG. 12
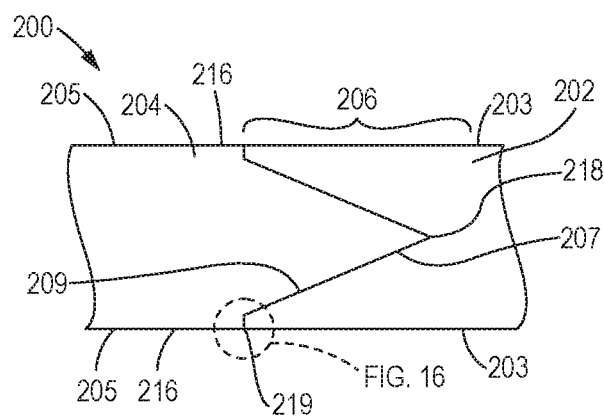
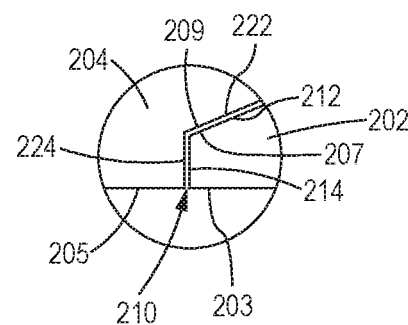
FIG. 13  FIG. 14

WEB SPLICE

BACKGROUND

Field of the Invention

This disclosure relates to a web splice. More particularly, this disclosure relates to a web splice comprising a butt joint or overlap joint connecting a trailing edge of an old (expiring) paper web and a leading edge of a new (replacement) paper web.

Description of the Related Art

Spiral tube winding is a continuous winding process. Paper has to be spliced together when the expiring roll runs out. For spiral paper tube winding, there are two main kinds of splices, an overlap splice or a butt joint splice. Manual splicing by operators typically results in an overlap joint, while automatic splicing typically creates a butt splice.

In both kinds of splicing methods, the web is typically cut 90 degrees from the machine direction/web running direction to achieve a straight/square edge. Typically, paper backed pressure sensitive tape is used to cover the straight joint and connect the two webs together. Double face tape is sometimes used to make an overlap splice.

The web for making a spirally wound tube has to go over or under many stationary bars and rollers. The web edge also makes contact with various types of paper edge guides such as set collars or bars. A butt joint is preferred because of the lower overall thickness at the joint. However, a butt joint with a straight/square edge is inherently prone to break, especially if there is any misalignment of the two webs.

This disclosure relates to a better splice and a better way to splice paper webs together.

SUMMARY OF THE INVENTION

The present disclosure is a web splice for attaching two webs, such as paper webs used in paper converting operations. The web splice comprises a first, expiring web, a second, new web and an adhesive member. The first web has a trailing edge and first side edges defining a first width. The trailing edge defines a first shape that is non-linear. The first side edges are parallel to a web running direction. The second web has a leading edge and second parallel side edges and a second width the same as the first width of the first web. The leading edge defines a second shape that is non-linear, and the second side edges are also parallel to the web running direction. The trailing edge and the leading edge form a non-linear butt joint. The adhesive member is adhered to the first and second webs and overlaps at least a portion of the butt joint. The butt joint comprises a middle section and two side sections. The middle section is located downstream of the two side sections. Each side section terminates at a junction with one of the side edges and forms an acute included angle with a first side edge of the first web.

THE DRAWINGS

FIG. 5 is a top view of a third web splice according to the disclosure.

FIG. 6 is a top view of a fourth web splice according to the disclosure.

FIG. 7 is a top view of a fifth web splice according to the disclosure.

FIG. 8 is a top view of a sixth web splice according to the disclosure.

FIG. 9 is a top view of a seventh web splice according to the disclosure.

FIG. 10 is a top view of an eighth web splice according to the disclosure.

FIG. 11 is a top view of a ninth web splice according to the disclosure.

FIG. 12 is a top view of a tenth web splice according to the disclosure.

FIG. 13 is a top view of an eleventh web splice according to the disclosure.

FIG. 14 is a close up of a portion of the web splice of FIG. 13.

DETAILED DESCRIPTION OF THE INVENTION

Figure 1:
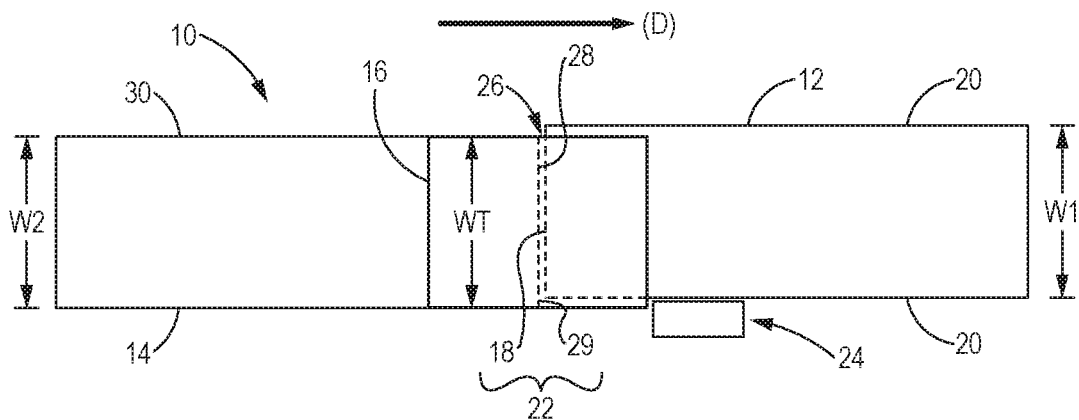
FIG. 1 is a top view of a web splice according to the prior art.

While this disclosure may be embodied in many forms, there is shown in the drawings and will herein be described in detail one or more embodiments with the understanding that this disclosure is to be considered an exemplification of the principles of the disclosure and is not intended to limit the disclosure to the illustrated embodiments.

Terminology

Adhesive member: A term including tape and labels and other devices suitable for joining two webs.

Butt joint: A type of web joint—the other type being an overlapping joint—in which the trailing edge of an expiring web and the leading edge of a new web do not overlap. The trailing edge of the expiring web and the leading edge of the new web may abut (touch) or may define a small gap therebetween. See FIG. 2, for example.

Downstream: In the direction of web travel.

Interlocking joint: A butt joint in which the trailing edge of the expiring web and the leading edge of the new web are "locked" together and cannot be separated while in the same plane without moving one of the webs out of the plane. See FIG. 4, for example.

Label: A device, typically comprising a flexible substrate with adhesive on one side and a removable backing sheet covering the adhesive, for adhering or otherwise joining items together. The substrate may be paper or other suitable material. The adhesive may be a pressure sensitive adhesive.

Overlap joint: A splice in which the webs overlap. See FIG. 3.

Web joint: The area in which two webs are joined together. There are two main types web joints: butt joints and overlap(ping) joints.

Web Splice: A structure comprising two webs joined together with an adhesive member.

Tape: A device, typically comprising a flexible substrate with adhesive on one side, for adhering or otherwise joining articles such as webs together. The substrate may be paper or other suitable material. The other (non-adhesive) side of the tape may be covered in a release coating so that the tape can be wound into a roll and then unwound as it is used. The adhesive may be a pressure sensitive adhesive. Double sided tape typically comprises a flexible substrate with adhesive on both sides.

Upstream: In the direction opposite of web travel.

The Prior Art

Turning to the drawings, there is shown in FIG. 1 a conventional web splice 10. The web splice 10 comprises a first web 12, a second web 14 and an adhesive member 16.

The first web 12 has a trailing edge 18 and first side edges 20 defining a first width (W1). The trailing edge 18 is straight (linear) and forms a right angle with the sides edges 20. The trailing edge 18 is orthogonal to the web running direction (D). The first side edges 20 are parallel to the web running direction (D).

The second web 14, upstream from the first web 12, has a leading edge 28 and second parallel side edges 30 defining a second width (W2) which is the same as the first width (W1). The leading edge 28 is straight (linear) and forms a right angle with the second side edges 30. The second side edges 30 are parallel to the web running direction (D).

The trailing edge 18 and the leading edge 28 form a linear (square edge) butt joint 22. The angle of the leading edge 28 with respect to the side edges 30 is ninety degrees. The angle of the trailing edge 18 with respect to the side edges 20 also is ninety degrees.

The adhesive member 16 is adhered to the first and second webs 12, 14 and overlaps the butt joint 22. The adhesive member 16 has a width (WT) approximately the same as the first width (W1) and the second width (W2).

Ideally, the expiring web and the new web are perfectly aligned in the lateral direction (perpendicular to the web running direction (D)), but it is not unusual for the webs to be offset or misaligned. For example, in FIG. 1 the second web 14 is offset (misaligned) from the first web 12. As a result, a portion 29 of the leading edge 28 extends laterally outwardly from a side edge 20 of the first web 12. This "exposed" portion 29 of the leading edge 28 is susceptible to getting caught on structures such as a stationary paper guide 24, making the straight joint 22 inherently prone to break.

In spiral winding operations involving a spiral mandrel, if the two edges 18, 28 are offset by as little as ¼", ⅛" or even less, the joint 22 may break or tear when it contacts the paper edge guides 24 before reaching the spiral mandrel (not shown). Also, if there is a large gap 26 between the two edges 18, 28, for example, a gap of 3/16", ¼" or more, the gap 26 will create a ditch (absence of web material) in the joined webs, and the joint 22 may tear when it passes through rod bars, paper tensioners or other structures.

In this conventional splice, the width (WT) of the tape 16 must be the same or very close to the paper widths W1, W2. If tape 16 is too wide, it will stick to structures during processing and cause the webs 12, 14 to break. If tape 16 is too narrow, the untaped edges 18, 28 can catch a bar, edge guide 24 or other structure and cause web tearing or breakage. By contrast, the web splices described herein can be used to join webs of different widths because the adhesive member width need not be the same or very close to the paper widths.

First Embodiment

Figure 2:
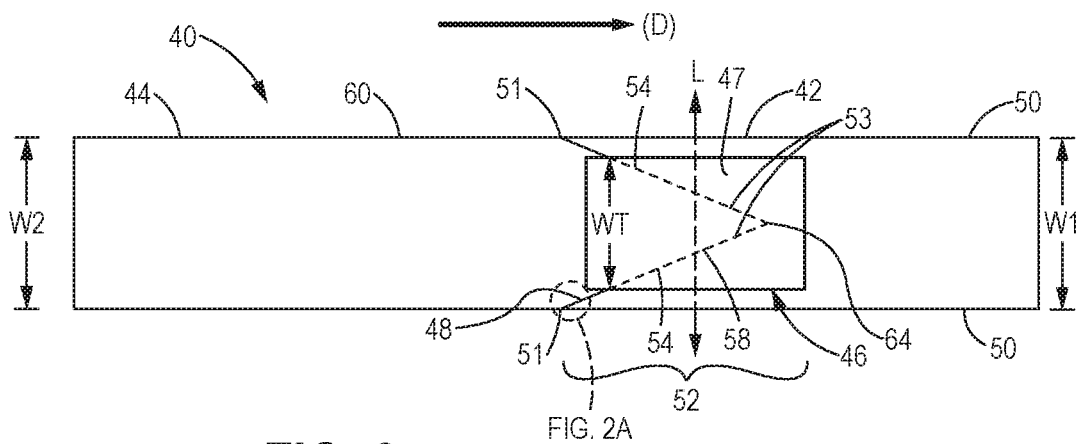
FIG. 2 is a top view of a first web splice according to the disclosure.

FIG. 2 is a top view of a first embodiment of a web splice 40 according to the disclosure. The web splice 40 comprises a first (expiring) web 42, a second (new) web 44 and an adhesive member 46. The adhesive member (46) may comprise a first adhesive side (facing the first web 42 and the second web 44) and a second non-adhesive side (47) (facing away from the first web 42 and the second web 44).

The first web 42 has a trailing edge 48 and first side edges 50 defining a first width (W1). The first side edges 50 are parallel to the web running direction (D). Instead of being straight, the trailing edge 48 has a first, non-linear shape, which in this case is a V-shape (as viewed from the right of the figure; i.e. downstream) having an apex 64.

The second web 44 has a leading edge 58 and second parallel side edges 60 defining a second width (W2) which is the same as the first width (W1). The second side edges 60 are parallel to the web running direction (D). Instead of being straight, the leading edge 58 has a second, non-linear shape which in this case also is a V-shape (as viewed from the right of the figure) having an apex 64.

The trailing edge 48 of the first web 42 and the leading edge 58 of the second web 44 form a non-linear butt joint 52. The leading edge 58 may form an exact fit with the trailing edge 48. In other words, the leading edge 58 may define a second, complimentary shape that matches the first shape, and are joined together so there is no gap between the leading edge 58 and the trailing edge 48.

Preferably the webs 42, 44 are laterally aligned. That is, preferably the side edges 50 of the first web 42 and the side edges 60 of the second web 44 are aligned. If the side edges of the webs are offset by more than ⅛ inch or so, one of the edges of the second web 44 will stick out (be exposed) and can catch on structures and destroy the splice 40. However, as explained below, the side edges 50, 60 need not be perfectly aligned due to the non-linear shape of the trailing and leading edges 48, 58 and thus the butt joint 52, and especially due to the fact that the butt joint 52 forms an acute angle with the side edges 50 of the first web 42 where the butt joint 52 meets the side edges 50, 60.

The butt joint 52 may comprise a middle section 53 and two trailing (upstream) side sections 54. The middle section 53 is distant (spaced apart) from the side edges 50 and may be located equidistant from each side edge 50. The middle section 53 may be located downstream (in the web running direction) of two trailing side sections 54, each forming a "leg" of the V. Each trailing side section 54 may be linear or another suitable shape, and extends from the middle section 53 to a junction 51 along a respective side edge 50, 60. The butt joint 52 may be thought of as extending in the machine direction from the apex 64 upstream to the junctions 51.

Since the webs 42, 44 do not overlap, the joined webs 42, 44 form a single continuous ply. That is, the joined webs 42, 44 (and thus the web splice 40) have a single thickness (not counting the added thickness of the adhesive member 46).

Angle of the Butt Joint at the Edge of the Web Splice

Figure 2A:
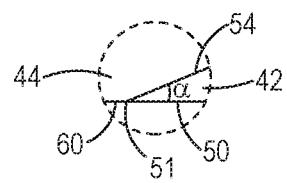
FIG. 2A is a close up of a portion of the web splice of FIG. 2.
Figure 3:
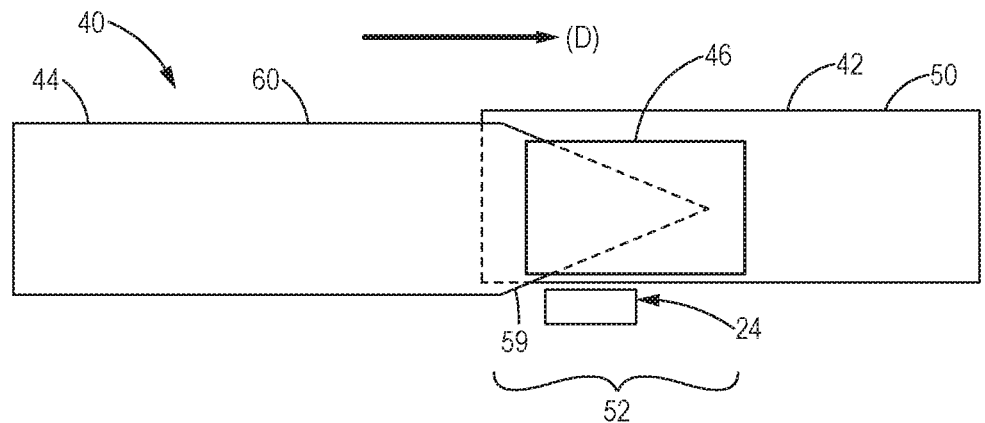
FIG. 3 is another top view of the web splice of FIG. 2.

As perhaps best shown in FIG. 2A, the angle (α) of the leading edge 58 with respect to the side edge 50 is less than ninety degrees. By cutting the second web 44 so that the leading edge 58 is angled at less than ninety degrees, and preferably less than 60 degrees and greater than 10 degrees, the leading edge 58 is less inclined to catch on structures or guides, even if the leading edge 58 includes an exposed portion 59 (when the second web 44 is offset from the first web 42 as shown in FIG. 3). Most preferably, the angle (α) of the leading edge 58 with respect to the side edge 50 is approximately 30 degrees to approximately 40 degrees.

Optional Gap Between the Webs

The two webs 42, 44 can be positioned such that the trailing edge 48 of the expiring web 42 continuously (or discontinuously) abuts the leading edge 58 of the new web 44, leaving no gap between the webs 42, 44 along the butt joint 52. However, the edges 48, 58 need not touch. The web splice 40 is expected to be operable even with a gap between the edges 48, 58. The gap may be anywhere from 1 mm to 3/16 inches or more.

Line of Intersection

For traditional web splices such as the web splice 10 shown in FIG. 1, a line (L) of intersection perpendicular to the web running direction (D) and crossing (intersecting) the web splice 10 will intersect the butt joint 22 at either an infinite number of intersecting points (when the line (L) intersects either the trailing edge 18 of the first web 12 or the leading edge 28 of the new web 14) or at zero points (when the line (L) intersects the gap 26 between the first web 12 and the new web 14.

By contrast, in many of the butt joints according to this disclosure, regardless of whether or not there's a gap between the webs, a line (L) perpendicular to the web running direction (D) and crossing the butt joint will intersect the two webs' leading or trailing edges at a discrete number intersecting points, that is, a number between zero and infinity.

For example, in the V-shaped web splice 40 of FIG. 2, a line (L) perpendicular to the web running direction (D) and crossing the butt joint 52 at the apex 64 intersects the butt joint 52 at one discrete point. A line (L) perpendicular to the web running direction (D) and crossing the web splice 40 at a location other than the apex 64 intersects the butt joint 52 at two discrete points, i.e., at one point along each of the two legs 53.

For some of the paper winding operations such as printing paper, liner boards, and even film, a knife with serrated cutting edge may be used to cut the webs. This can cause jagged edges on the leading and/or trailing edges of the butt joint. Depending on the "jaggedness" of the cut, a line (L) perpendicular to the web running direction (D) and crossing the web splice might intersect one of the webs at a higher number of points than if the cut(s) were "clean". For the purpose of this disclosure it should be understood that any discussion regarding points of intersection between a line (L) and a butt joint assumes a clean cut.

The Adhesive Member

The adhesive member 46 is adhered to the first and second webs 42, 44 and overlaps the butt joint 52. Preferably the adhesive member 46 is a label comprising a removable backing sheet but no release coating. It is advantageous to use a label in spiral paper winding operations because the adhesives used in such operations can adhere to the label better than to a tape having a release coating on the back.

Alternatively, tape may be used in spiral paper winding operations, but tape can leave a void (un-stuck area) along the tube.

Figure 4:
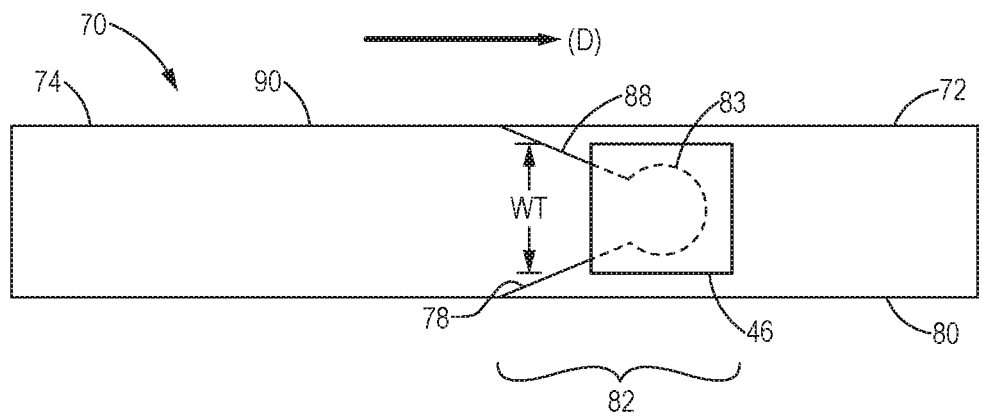
FIG. 4 is a top view of a second web splice according to the disclosure.

The adhesive member may be rectangular as shown in FIGS. 2 to 4. The adhesive member can be any suitable shape, including circular and oval shaped. The adhesive member can be as simple as a small circle tape/label or the like to cover the apex to prevent it from popping while bending over a bar or roller. The adhesive member should be large enough to cover at least the apex of the joint.

As explained above with respect to FIG. 1, in a conventional straight cut splice 10, the leading edge 28 of the second web 14 is approximately perpendicular to the web running direction (D). This orientation makes it necessary to apply the adhesive member 16 that extends the full width of the splice/web to hold down the entire leading edge 28 and prevent catching.

By contrast, the web splice disclosed herein avoids the ninety degree leading edge that is the result of a straight cut splice. For example, with the V-shaped splice 40 shown in FIG. 2, the leading edge 58 forms an acute angle (α), with the side edge 50 of the first web 42. As a result, the adhesive member 46 does not have to extend over the side sections 54 of the butt joint 52 or, for that matter, the full width of the webs 42, 44.

In a conventional butt joint splice, the tape width must equal the width of the paper web. Yet in making a spirally wound tube, multiple width paper webs may be used: 4 and 15/16 inches, 5 inches, 5 and 1/8 inches, etc., which requires the use of multiple adhesive members of varying widths.

In what is often referred to in the trade as an "automatic" web splicer, the tape is not applied automatically (i.e., without human intervention). Instead, the operator still must prepare the leading edge of the new web and the tape. Thus the conventional "automatic" method of splicing renders it difficult to make a spirally wound tube because of the need to use different width tapes. The present disclosure may allow for a "fully automatic" web splicer in making spirally wound tubes because the tape width need not match the varying widths of the webs. Instead, the adhesive member width (WT) need only be large enough to cover some or all of the middle section 53 of the butt joint 52, and can be a single layer.

In the case of a triangular cut (V-shaped) joint 52, if the adhesive member 46 is strong enough, it may be possible to use an adhesive member 46 having a width (WT) only large enough to cover little more than the apex 64 of the V-shaped butt joint 52.

An adhesive member may be adhered to one or both sides of the butt joint. Adhering both sides of the butt joint with an adhesive member can greatly increase the robustness and reliability of the splice.

Second Embodiment

FIG. 4 is a top view of a second web splice 70 according to the disclosure, one with an interlocking joint. The web splice 70 comprises a first (expiring) web 72, a second (new) web 74 and an adhesive member 46. The trailing edge 78 of the first web 72 and the leading edge 88 of the second web 74 form a non-linear butt joint 82. The first, expiring web 72 has a trailing edge 78 that defines a first ("keyhole") shape. The second, new web 74 has a leading edge 88 that defines a second shape that matches the first shape in interlocking fashion. When the two webs 72, 74 are positioned such that the trailing edge 78 of the expiring web 72 abuts the leading edge 88 of the new web 74 to form a butt joint 82, the webs 72, 74 are "locked" together.

The adhesive member 46 has a width (WT) substantially less than the width of the webs 72, 74, and just large enough to cover the rounded middle section 83 of the irregularly shaped butt joint 82. In testing, a four inch wide adhesive member was used successfully to join two webs having a 5 inch width, and a five inch wide adhesive member was used successfully to join two webs having a 7 inch width.

Third Embodiment

FIG. 5 is a top view of a third web splice 100 according to the disclosure (with the adhesive member not shown). The first, expiring web 102 and the second, new web 104 form a butt joint 106 having an irregular shape wherein the middle section 107 comprises three sides of a rectangle and each side section 108 is linear and forms an acute included angle (α) with the side edge 103 of the first web 102 at the junction 109 of the butt joint 106 and the side edge 103. The width of the middle section 107 can vary, as can the length of each side section 108.

It should be noted that a line (L) of intersection perpendicular to the web running direction (D) and crossing (intersecting) the butt joint 106 will intersect the butt joint 106 at two points, except at the extreme downstream end of the middle section 107, where the joint forms a line segment.

Fourth Embodiment

FIG. 6 is a top view of a fourth web splice 110 according to the disclosure (with the adhesive member not shown). The first, expiring web 112 and the second, new web 114 form a butt joint 116 having an irregular shape wherein the middle section 117 is a dovetail shape and each side section 118 is curved and forms an acute included angle with the side edge 113 of the first web 112 at the junction 119 of the butt joint 116 and the side edge 113.

Fifth Embodiment

FIG. 7 is a top view of a fifth web splice 120 according to the disclosure (with the adhesive member not shown). The first, expiring web 122 and the second, new web 124 form a butt joint 126 having an arced shape having an apex 128 and forming an acute included angle with the side edge 123 of the first web 122 at the junction 129 of the butt joint 126 and the side edge 123.

Sixth Embodiment

FIG. 8 is a top view of a sixth web splice 130 according to the disclosure (with the adhesive member not shown). The first, expiring web 132 and the second, new web 134 form a butt joint 136 having an arced shape having an apex 137 and forming an acute included angle with the side edge 133 of the first web 132 at the junction 139 of the butt joint 136 and the side edge 133. The arc shape is less extreme than in the FIG. 7.

Seventh Embodiment

FIG. 9 is a top view of a seventh web splice 140 according to the disclosure (with the adhesive member not shown). The first, expiring web 142 and the second, new web 144 form a butt joint 146 having a V-shape having a rounded apex 148 and forming an acute included angle with the side edge 143 of the first web 142 at the junction 149 of the butt joint 146 and the side edge 143.

Eighth Embodiment

FIG. 10 is a top view of an eighth web splice 150 according to the disclosure (with the adhesive member not shown). The first, expiring web 152 and the second, new web 154 form a W-shaped butt joint 156. The middle section 157 of the butt joint 156 comprises two apexes 158. The butt joint 156 forms an acute included angle with each side edge 153 of the first web 152 at the junction 159 of the butt joint 156 and the side edge 153.

In the W-shaped butt joint 156 of FIG. 10, a line (L) perpendicular to the web running direction (D) and crossing the web splice at the apexes 158 intersects the butt joint 156 at two discrete points, the apexes 158. A line (L) perpendicular to the web running direction (D) and crossing the butt joint 156 at the junctions 159 intersects the butt joint 156 at three discrete points. And a line (L) perpendicular to the web running direction (D) and crossing the butt joint 156 at a location upstream of the apexes 158 and downstream of the junctions 159 intersects the butt joint 156 at four discrete points.

Ninth Embodiment

FIG. 11 is a top view of a ninth web splice 160 according to the disclosure (with the adhesive member not shown). The trailing edge 161 of the first, expiring web 162 and the leading edge 165 of the second, new web 164 form a butt joint 166 having an irregular shape wherein the middle section 167 of the butt joint 166 comprises three sides of a trapezoid. Each side section 168 of the butt joint 166 is linear and forms an acute included angle with the side edge 163 of the first web 162 at the junction 169 of the butt joint 166 and the side edge 163. The width of the middle section 167 can vary, as can the length of each side section 168. Although the length of each side section 168 is less than that of the side sections in previous embodiments, this ninth web splice 160 still provides the "edge advantage" previous embodiments. That is, angling the side sections 168 so that any exposed portion of the leading edge 165 is less inclined to catch or snag on structures, even if the leading edge 165 includes an exposed portion (when the second web 164 is offset from the first web 162).

Tenth Embodiment

FIG. 12 is a top view of a tenth web splice 170 according to the disclosure (with the adhesive member not shown). The web slice 176 is similar to the web splice 106 shown in FIG. 5, but with a wider middle section 177 and shorter sides 178. The trailing edge 171 of the first, expiring web 172 and the leading edge 175 of the second, new web 174 form a butt joint 176 having an irregular shape wherein the middle section 177 comprises three sides of a rectangle and each side section 178 is linear and forms an acute included angle with the side edge 173 of the first web 172 at the junction 179 of the butt joint 176 and the expiring web side edge 173. Again, angling the side sections 178 (so that each side section 178 forms an acute included angle with a side edge 173 of the first web 172 at the junction 179 of the butt joint 1176 and the side edge 173) minimizes the possibility that any exposed portion of the leading edge 175 of the new web 174 will catch or snag on structures.

Eleventh Embodiment

FIG. 13 is a top view of an eleventh web splice 200 according to the disclosure (with the adhesive member not shown). FIG. 14 is a close up of a portion of the web splice 200 of FIG. 13. The first, expiring web 202 comprises two sides edges 203 and a trailing edge 207. The second, new web 204 comprises two side edges 205 and a leading edge 209. The trailing edge 207 of the first, expiring web 202 and the leading edge 209 of the second, new web 204 form a butt joint 206.

The two webs 202, 204 can be positioned such that the trailing edge 207 continuously abuts the leading edge 209, leaving no gap between the webs 202, 204 along the butt joint 206. Alternatively, the two webs 202, 204 can be positioned such that there is a gap 210 between trailing edge 207 and the leading edge 209 as shown in FIG. 14. The gap 210 may be anywhere from 1 mm to 3/16 inches or more.

Preferably the trailing edge 207 and the leading edge 209 are the same shape. For example, in the illustrated embodiment, the trailing edge 207 comprises a middle section 212 and two side sections 214 extending from the middle section 212 to a respective side edge 203 of the expiring web 202. Similarly, the leading edge 209 of the new web 204 comprises a middle section 222 and one or two side sections 224 extending from the middle section 222 to the edge 205 of the expiring web 202.

In the illustrated embodiment the middle sections 212, 222 have complimentary (matching) V-shapes, although they can be other shapes. The trailing edge side sections 214 are linear and extend from the middle section 212 to their respective side edges 203. The leading edge side sections 224 are linear and extend from the middle section 222 to their respective side edges 205. The middle sections 212, 222 may be located downstream (in the web running direction) of the side sections 214, 224.

The trailing edge 207 and the leading edge 209 form a butt joint 206. The butt joint 206 extends across the entire width of the joined webs from one side edge 216 to the opposite side edge 216.

The trailing edge side sections 214 form a right angle with the first side edge 203. The leading edge side sections 224 form a right angle with the second side edge 205. Each first side edge 203 and the corresponding second side edge 205 are co-linear and form a single continuous side edge 216. Consequently, the butt joint 206 forms a right angle with the continuous side edge 216.

The apexes 218 of each V-shaped middle section 212, 222 may be used by an operator or machine to properly align the expiring web 202 and the new web 204. When the two webs 202, 204 are properly aligned (so that their respective side edges are co-linear), the joined webs 202, 204 lack any exposed portions.

Should the webs 202, 204 be mis-aligned, a portion of the leading edge 209 that is perpendicular to the machine direction may be exposed. To minimize the possibility that the exposed portion will catch or snag, the length of the side sections 224 of the new web 204 should be minimized, preferably so that they are no longer than 3/16 inch.

An adhesive member (not shown) is adhered to the webs 202, 204 and overlaps the butt joint 206 to form the web splice 200. The adhesive member need not match exactly the width of the webs 202, 204. Instead, the adhesive member width need only be large enough to cover some or all of the middle sections 212, 222 of the trailing edge 207 and the leading edge 209. Preferably, the adhesive member is wide enough to cover at least a portion of the side sections 214, 224.

It should be noted that a line (L) of intersection perpendicular to the web running direction (D) and crossing (intersecting) the butt joint 206 will intersect the butt joint 206 at either one point (at the apex 218), two points (between the apex 218 and the trailing edge side sections 214) or an infinite number of points (at the trailing edge side sections 214).

Twelfth Embodiment

Figure 15:
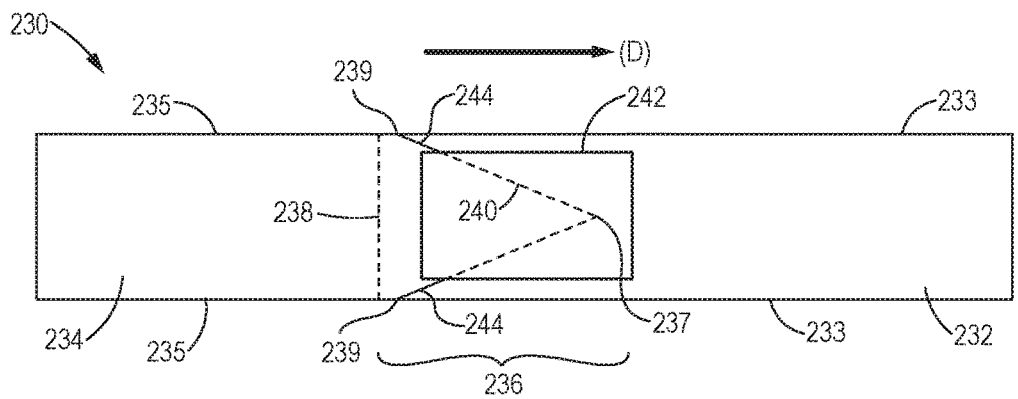
FIG. 15 is a top view of a twelfth web splice according to the disclosure.

FIG. 15 is a top view of a twelfth web splice 230 according to the disclosure. The first, expiring web 232 and the second, new web 234 form an overlapped joint 236. The first, expiring web 232 has a linear trailing edge 238 that is oriented perpendicular to the wed direction (D). The second, new web 234 has a leading edge 240 that defines a "V" shape having legs or side sections 244, each leg 244 terminating at an end point 239 coinciding with a side edge 235 of the new web 234. The two webs 232, 234 are aligned in overlapping fashion so that the trailing edge 238 of the expiring web 232 is "upstream" of the end points 239 where the legs 240 of the V-shaped leading edge 240 meet the side edges 235. An adhesive member 242 is adhered to the webs 232, 234 and partially overlaps (covers) the overlapped joint 236 to form the web splice 230.

As in many of the previous embodiments, each leg or side edge 244 of the V-shaped leading edge 240 forms an acute included angle with a side edge 233 of the first web 232 and thus minimizes the possibility that any exposed portion of the leading edge 240 of the new web 234 will catch or snag on structures.

In the V-shaped overlapping joint 236 of FIG. 15, a line (L) perpendicular to the web running direction (D) and crossing the overlapping joint 256 at the apex 237 intersects the joint 236 at one discrete point. A line (L) perpendicular to the web running direction (D) and crossing the joint 236 at a location upstream of the apex 237 and downstream of the junctions 239 intersects the butt joint 52 at two discrete points, i.e., at one point along each of the two legs 244.

Thirteenth Embodiment

Figure 16:
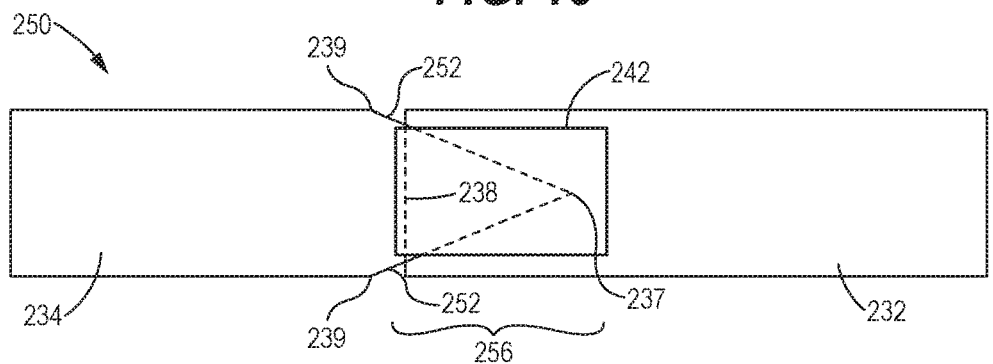
FIG. 16 is a top view of a thirteenth web splice according to the disclosure.

FIG. 16 is a top view of a thirteenth web splice 250 according to the disclosure. The web splice 250 is similar to that shown in FIG. 15 in that the shape of the webs is the same. The first, expiring web 232 and the second, new web 234 still form an overlapped joint 236, but the webs 232, 234 do not overlap as much. More specifically, the trailing edge 238 of the first, expiring web 232 is "downstream" of the end points 239 where the legs 240 of the V-shaped leading edge 240 meet the side edges 235. As a result, the new web 232 comprises exposed portions 252 that do not abut and are not covered by the expiring web 232.

In the V-shaped overlapping joint 256 of FIG. 16, a line (L) perpendicular to the web running direction (D) and crossing the overlapping joint 256 at the apex 237 intersects the joint 256 at one discrete point. A line (L) perpendicular to the web running direction (D) and crossing the joint 256 at a location upstream of the apex 237 and downstream of the trailing edge 238 intersects the butt joint 52 at two discrete points.

Fourteenth Embodiment

Figure 17:
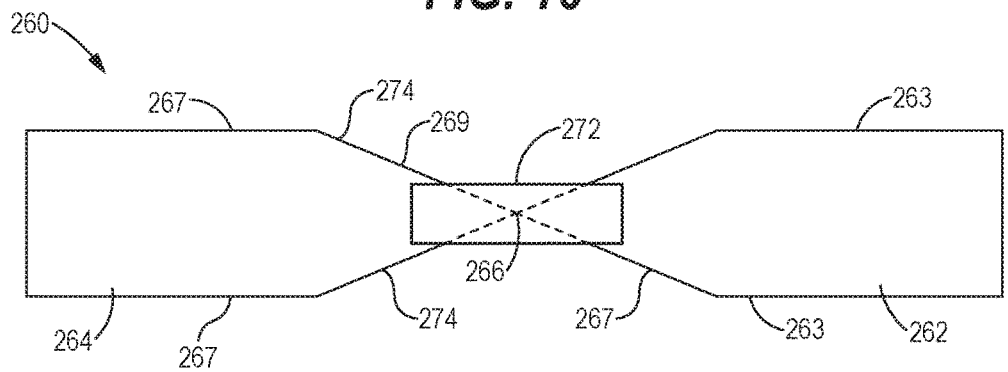
FIG. 17 is a top view of a fourteenth web splice according to the disclosure.

FIG. 17 is a top view of a fourteenth web splice 260. The trailing edge 267 of the expiring web 262 has a first V-shape and the leading edge 169 of the new web 264 has a second V-shape that is a mirror image to the first V-shape. The joint 266 where the trailing edge 267 of the first, expiring web 262 and the leading edge 269 of the second, new web 264 meet is a single point, and thus there is minimal contact between the webs. A first adhesive member 272 overlays the joint 266 as well as portions of the first, expiring web 232 and the second, new web 234. Preferably a similarly sized second adhesive member (obscured by the first adhesive member 272) is affixed to the web splice 260 on the side of the webs 262, 264 opposite the first adhesive member 272 (i.e., the side away from the viewer in FIG. 14) so there are no exposed adhesive areas from the adhesive members. It is believed that this configuration reduces the possibility that any exposed portions 274 of the leading edge 269 of the new web 264 will catch or snag on structures.

Fifteenth Embodiment

Figure 18:
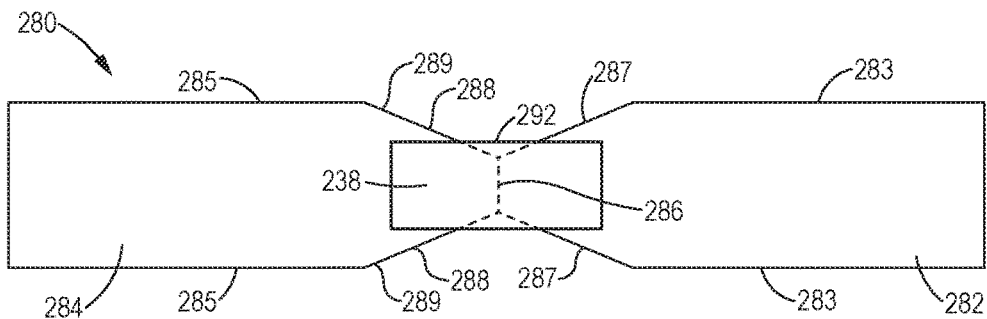
FIG. 18 is a top view of a fifteenth web splice according to the disclosure.

FIG. 18 is similar to the web splice 260 of FIG. 17 except that the line of contact 286 between the webs 282, 284, aka joint 286, is larger than the point of contact 266 in FIG. 17. The trailing edge 287 of the expiring web 282 has a first trapezoidal shape and the leading edge 288 of the new web 284 has a second trapezoidal shape that is a mirror image to the first trapezoidal shape. A first adhesive member 292 overlays the joint 286 as well a portion of the first, expiring web 282 and a portion of the second, new web 284. Preferably a similarly sized second adhesive member (obscured by the first adhesive member 292) is affixed to the web splice 280 on the side of the webs 282, 284 opposite the first adhesive member 292 (i.e., the side away from the viewer in FIG. 18) so there are no exposed adhesive areas from the adhesive members. It is believed that this configuration reduces the possibility that any exposed portions 289 of the leading edge 288 of the new web 284 will catch or snag on structures.

It should be noted that a line (L) of intersection perpendicular to the web running direction (D) and crossing (intersecting) the butt joint 286 will intersect the butt joint 286 at an infinite number of points.

Many other joint shapes are contemplated that fall within the scope of this disclosure. The previous examples are not intended to limit the invention to those examples.

INDUSTRIAL APPLICABILITY

Thus there has been described a web splice for attaching two webs, such as paper webs used in paper converting operations. The web splice minimizes the possibility that the leading edge of the new web will catch on the paper converting equipment and cause issues such as ply break or tension spike. The web splice also reduces the phenomenon of "dog ear" in which portions of the web edges splay outwardly, making it easier for the spliced webs to go through a spiral winding process. The web splice exhibits acceptable tensile strength, especially when two adhesive members are used with their adhesive sides in a facing relationship.

The web splice comprises a first, expiring web, a second, new web and an adhesive member. The first web has a trailing edge and first side edges defining a first width. The trailing edge defines a first shape that is non-linear. The first side edges are parallel to a web running direction. The second web has a leading edge and second parallel side edges and a second width the same as the first width of the first web. The leading edge defines a second shape that is non-linear, and the second side edges are also parallel to the web running direction. The trailing edge and the leading edge form a non-linear butt joint. The adhesive member is adhered to the first and second webs and overlaps at least a portion of the butt joint. The butt joint comprises a middle section and two side sections. The middle section is located downstream of the two side sections. Each side section terminates at a junction with one of the side edges and forms an acute included angle with a first side edge of the first web.

The web splice has the following advantages:
1. The splice has a much higher resistance to the issues caused from "bumps" (such as scrapes, rods, edge guides, finger plate in the tensioners etc.) that can occur during processing. This higher resistance will reduce number of paper breaks and therefore increases productivity.
2. The splice enables fully automatic taping, which can result in a fully automatic splicing system.
3. Because the adhesive member may be a label type of tape, it does not require a release coating/treatment, and so it can adhere to the paper in a spiral wound tube.
4. The web splice may be used in high speed paper operations.

It is understood that the embodiments of the disclosure described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A web splice for attaching two webs, the web splice comprising:
   a first, expiring web having a trailing edge and first side edges defining a first width (W1), the trailing edge defining a first shape that is non-linear, the first side edges being parallel to a web running direction (D);
   a second, trailing web having a leading edge and second parallel side edges and a second width (W2) the same as the first width (W1), the leading edge defining a second shape that is non-linear and matches the first shape in interlocking fashion, the second side edges being parallel to the web running direction (D);
   the trailing edge and the leading edge forming a non-linear butt joint in which the trailing edge and the leading edge are locked together and do not separate while in the same plane without moving one of the webs out of the plane, the non-linear butt joint comprising a middle section and two side sections, the two side sections extending from the middle section, each side section terminating at a junction of a first side edge and a second side edge, each side section forming an acute included angle ($\alpha$) with a first side edge of the first web; and
   a single sided adhesive member adhered to the first web and the second web and overlapping the middle section, the adhesive member having a width less than the first width (W1) and less than the second width (W2).

2. The web splice of claim 1 wherein:
   the acute included angle ($\alpha$) is between 10 degrees and 60 degrees.

3. The web splice of claim 1 wherein:
   the butt joint is curved at the junction of the first side edge and the second side edge.

4. The web splice of claim 1 wherein:
   the first web and the second web are positioned with respect to each other such that the trailing edge continuously abuts the leading edge.

5. The web splice of claim 1 wherein the adhesive member comprises a first adhesive side and a second non-adhesive side.

6. The web splice of claim 1 wherein a portion of each side section adjacent the junction is not covered by the adhesive member.

7. The web splice of claim 1 wherein the first width (W1) is not the same as the second width (W2).

8. The web splice of claim 1 wherein:
the non-linear butt joint comprises a single middle section.

9. A web splice comprising:
a first, expiring web having a trailing edge and first parallel side edges defining a first width (W1), the first side edges being parallel to a web running direction (D);
a second, trailing web having a leading edge and second parallel side edges and a second width (W2);
the trailing edge and the leading edge forming a single non-linear, non-overlapping butt joint having a constant thickness and in which the trailing edge and the leading edge are locked together and do not separate while in the same plane without moving one of the webs out of the plane, the non-linear, non-overlapping butt joint comprising a middle section and two side sections extending rearwardly from the middle section, each side section terminating at a junction of a side edge of the first web, each side section forming an acute included angle (α) with a side edge of the first web; and
a single-sided adhesive member adhered to the first web and the second web and overlapping the middle section; wherein
the trailing edge defines a first shape;
the leading edge defines a second, complementary shape that matches the first shape in interlocking fashion.

10. The web splice of claim 9 wherein:
the trailing edge continuously abuts the leading edge; and
a line (L) extending across the first web and the second web along the butt joint and perpendicular to the web running direction (D) intersects the butt joint at two points, except at an end of the middle section opposite the two side sections.

11. A web splice for attaching two webs, the web splice comprising:
a first, expiring web having a trailing edge and first parallel side edges defining a first width (W1), the first side edges being parallel to a web running direction (D);
a second, trailing web having a leading edge and second parallel side edges and a second width (W2);
the trailing edge and the leading edge forming a single, non-linear, non-overlapping butt joint having a constant thickness in which the trailing edge and the leading edge are locked together and do not separate while in the same plane without moving one of the webs out of the plane, the non-linear, non-overlapping butt joint comprising a middle section and two side sections extending rearwardly from the middle section, each side section terminating at a junction of a side edge of the first web, each side section forming an acute included angle (α) with a side edge of the first web; and
a single-sided adhesive member adhered to the first web and the second web and overlapping the middle section; wherein
the first, expiring web has a trailing edge that defines a first shape; and
the second, trailing web has a leading edge that defines a second shape that matches the first shape in interlocking fashion such that the first, expiring web and the second, trailing web are locked together in a web running direction (D).

12. The web splice of claim 11 wherein:
the middle section of the butt joint has a dovetail shape.

* * * * *